United States Patent [19]

Akatsuka et al.

[11] 4,151,118
[45] Apr. 24, 1979

[54] PROCESS FOR SULFURIZATION OF HYDROGENATION CATALYSTS

[75] Inventors: Hisashi Akatsuka; Kiyoaki Naniwa, both of Tokyo; Nobukazu Iemura, Chita; Kazufumi Ishida, Kawasaki, all of Japan

[73] Assignee: Idemitsu Kosan Co., Ltd., Tokyo, Japan

[21] Appl. No.: 871,325

[22] Filed: Jan. 23, 1978

[30] Foreign Application Priority Data

Apr. 2, 1977 [JP] Japan .................................. 52-36973

[51] Int. Cl.$^2$ .............................................. B01J 27/02
[52] U.S. Cl. .................................. 252/439; 208/216 R
[58] Field of Search ......................................... 252/439

[56] References Cited

U.S. PATENT DOCUMENTS

| | | | |
|---|---|---|---|
| 2,135,058 | 11/1938 | Spicer et al. .................... | 252/439 X |
| 2,758,957 | 8/1976 | Nozoki .............................. | 208/143 |
| 3,151,175 | 9/1964 | Goldsmith ....................... | 252/439 X |
| 3,423,307 | 1/1969 | McKinney et al. ............. | 208/213 |
| 3,528,910 | 9/1970 | Haney et al. ................... | 252/439 X |
| 3,933,683 | 1/1976 | Hilfman ........................... | 252/439 |
| 3,948,763 | 4/1976 | Christman et al. ............ | 208/254 H X |

FOREIGN PATENT DOCUMENTS

747226   1972   Japan.

*Primary Examiner*—Delbert E. Gantz
*Assistant Examiner*—William G. Wright
*Attorney, Agent, or Firm*—Frishauf, Holtz, Goodman & Woodward

[57] ABSTRACT

A process for activating a hydrogenation catalyst in a hydrogenation system having multiple reaction stages by sulfurization comprising sulfurizing the hydrogenation catalyst in each reaction stage with a sulfur-containing hydrocarbon oil and a hydrogen-rich gas containing less than 1000 ppm (by volume) of hydrogen sulfide, successively in the order of from the final reaction stage thereof to the first reaction stage thereof.

7 Claims, 1 Drawing Figure

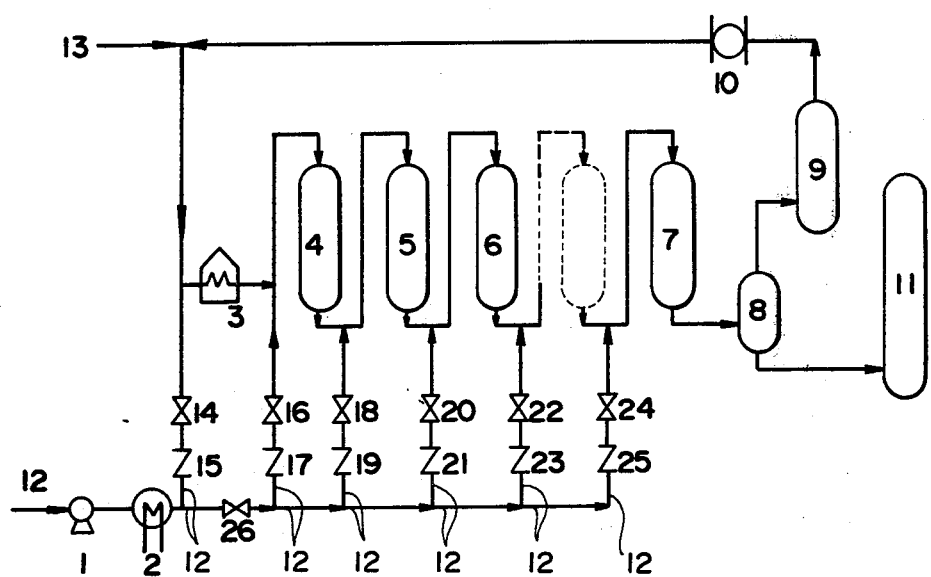

PROCESS FOR SULFURIZATION OF HYDROGENATION CATALYSTS

BACKGROUND OF THE INVENTION

1. Field of the Invention

This invention relates to a process for sulfurizing a hydrogenation catalyst. More particularly, it is concerned with the activation of a hydrogenation catalyst charged to a hydrogenation system having multiple reaction stages through the sulfurization thereof.

2. Description of the Prior Art

Hydrorefining is an important process for the refining of petroleum. Recently hydrodesulfurization has attracted attention from the standpoint of preventing environmental pollution. Additionally, it has recently been required that the sulfur content of petroleum products be reduced further. The required desulfurization effect, however, is not attained by desulfurization with conventional single stage reactors. Thus, multi-stage reactors having great desulfurization capacity have recently been employed.

Catalysts for use in hydrorefining processes are preferably activated prior to use thereof by sulfurization processing whereby they are converted from the metal or oxide type into the sulfide type. The sulfurization processing is carried out by the use of a hydrogen sulfide gas, low molecular sulfur compound, sulfur-containing hydrocarbon oil, feed oil for desulfurization or the like. For the sulfurization processing of catalysts for a multi-stage reaction process, for example, a procedure of sulfurizing with a sulfur-containing hydrocarbon oil and a hydrogen-rich gas in the order of flow of the reaction stages is known; this is described in Japanese Patent Publication No. 7226/1972. In this procedure, however, almost all of the sulfur contained in the sulfur-containing hydrocarbon oil is converted to a hydrogen sulfide in the first reaction stage, and the sulfurization of catalyst in a subsequent reaction stage or stages is conducted substantially with hydrogen sulfide.

Our experiments have revealed that activation of a hydrogenation catalyst with a sulfur-containing hydrocarbon oil such as a light gas or the like provides a sulfurized catalyst of high activity, whereas activation with hydrogen sulfide provides a catalyst of unsatisfactory activity. However, even though sulfur-containing hydrocarbon oils such as light gas oils and the like are employed, if the sulfurization of a catalyst charged to a multi-stage reactor is carried out in the order of flow, hydrogen sulfide formed in sulfurizing the catalyst in the first stage passes over the unsulfurized catalyst in a subsequent stage or stages. As a result, the unsulfurized catalyst in the subsequent stage or stages is sulfurized with hydrogen sulfide and only unsatisfactory hydrogenation is attained in such stage or stages.

SUMMARY OF THE INVENTION

The principal object of this invention is to provide a process for converting a hydrogenation catalyst charged to an existing multi-stage reactor into a high activity, sulfurized catalyst without modifying the structure of the existing hydrogenation system including multi-stage reactors on a large scale.

It has been found that the above object is attained by sulfurizing the catalyst with a sulfur-containing hydrocarbon oil and a hydrogen-rich gas in the order of from the final stage of the multi-stage reaction process to the first stage: that is, in the opposite direction or order of the conventional procedure.

Thus, this invention provides a process for activating a hydrogenation catalyst charged to a hydrogenation system of multiple reaction stages, which comprises sulfurizing the hydrogenation catalyst charged to each reaction stage with a sulfur-containing hydrocarbon oil and a hydrogen-rich gas having a hydrogen sulfide concentration of not more than 1,000 ppm (by volume), successively in the order of from the final reaction stage to the first reaction stage.

BRIEF DESCRIPTION OF THE DRAWINGS

The FIGURE schematically illustrates a multi-stage hydrogenation system to which the method of this invention can be applied.

DETAILED DESCRIPTION OF THE INVENTION

A multi-stage hydrogenation system is employed principally for the hydrodesulfurization of petroleum. In addition, the system can be employed for a combination of treatments including hydrorefining, hydrocracking, hydrofinishing and the like.

Various kinds of catalysts can be charged to each reaction stage of the system according to the purpose of hydrogenation processing. For example, hydrogenation catalysts containing one or more members of molybdenum, tungsten, cobalt and nickel in the state of metal or oxide can be employed.

The method of this invention is explained hereinafter by reference to the drawing.

Referring to the FIGURE, a sulfur-containing hydrocarbon oil, for example, a light gas oil containing from about 0.5 to about 2 percent by weight of sulfur is passed through conduit 12 to feed pump 1, heat exchanger 2, valve 26, check valve 25 and valve 24 to final reaction stage 7. A hydrogen-rich gas is passed from conduit 13 to heater 3 and stage 7, and to reaction stages 4, 5, 6, etc. During the sulfurization processing, valve 14 is always closed and valve 26 is open. Similarly, during hydrogenation processing, valve 26 is always closed and valve 14 is open.

The hydrogen-rich gas is not always required to be pure hydrogen. Thoses gases containing low boiling hydrocarbons and the like as impurities in an amount of below 30 percent by volume based on the total gas volume can be employed. The hydrogen-rich gas preferably contains little or no hydrogen sulfide, and the allowable upper limit is 1,000 ppm (by volume). Above 1,000 ppm, the hydrogenation catalyst is sulfurized, with the hydrogen sulfide, and the hydrogenation activity of the thus treated hydrogenation catalyst is unsatisfactory.

Conditions under which the sulfurization of the hydrogenation catalyst charged to final reaction stage 7 with the above-described sulfur-containing hydrocarbon oil and hydrogen-rich gas can be determined appropriately depending upon the catalyst, apparatus, etc. The preferred conditions are: temperature, 200° to 450° C.; space velocity, 0.1 to 3.0 V/V/hr; pressure, 40 to 200 Kg/cm$^2$; reactor hydrogen rate, 90 to 1700 Nm$^3$/Kl; and sulfurization time, 2 to 40 hours.

When the hydrogenation catalyst is processed under the above conditions, the sulfur contained in the sulfur-containing hydrocarbon oil deposits thereon in a proportion of from 2 to 10 percent by weight of the total weight of the catalyst, and the sulfurization of the catalyst is thus accomplished. It is considered that the sulfurization of the hydrogenation catalyst is accomplished with the sulfur precipitated from the sulfur-containing hydrocarbon, and that it is not by the action of the hydrogen sulfide resulting from the reaction between the hydrogen-rich gas and sulfur contained in the sulfur-containing hydrocarbon with the aid of the catalyst.

After the sulfurization processing of the hydrogenation catalyst in final reaction stage 7 is completed, the hydrogenation catalyst in the foregoing reaction stage (shown by a dotted line) is sulfurized. In sulfurizing the hydrogenation catalyst in the foregoing reaction stage, a sulfur-containing hydrocarbon oil such as a light gas oil or the like, and a hydrogen-rich gas are introduced therein in the same manner as in final reaction stage 7, and the sulfurization processing is carried out under substantially the same conditions as described above.

In a preferred embodiment, the hydrogen-rich gas containing hydrogen sulfide which has been used for the sulfurization in final reaction stage 7 and discharged the refrom, is introduced into gas washing column 9 where the hydrogen sulfide is removed to below 1,000 ppm (by volume). The thus purified gas is circulated via compressor 10 and heater 3, and is used for the sulfurization of the catalyst in the foregoing reaction stage.

When the catalyst in the foregoing reaction stage is sulfurized in the manner as described above, a hydrogen-rich gas containing hydrogen sulfide resulting from the sulfurization processing leaves the foregoing reaction stage, is passed through final reaction stage 7, separator 8 and gas washing column 9. In this way, it is recycled. In this case, although hydrogen sulfide passes over the catalyst in final reaction stage 7, since the catalyst has already been subjected to the sulfurization processing, it is substantially free of mal sulfurization with the hydrogen sulfide.

In the Figure, 4, 5, and 6 show a first stage, a second stage and a third stage, respectively. Similarly, 10 is a compressor, 11 a fractionator, 12 a hydrocarbon oil conduit and 13 a hydrogen-rich gas conduit. 14, 16, 18, 20 and 22 are valves, and 15, 17, 19, 21 and 23 are check valves.

The sulfurization processing described above is successively carried out at each stage toward a preceding reaction stage, and finally the catalyst in the first reaction stage, shown as 4, is sulfurized. In this way, the catalyst in each reaction stage of the hydrogenation apparatus is converted into the sulfide type of catalyst; thus, high catalyst activity is assured and its life is lengthened markedly.

Therefore, the method of this invention can be effectively employed in the petroleum refining industry in which multi-stage hydrogenation of petroleum is effected.

In the following example, a light gas oil and hydrogen sulfide were employed as feed materials for sulfurization of a catalyst, and the activities of the sulfurized catalysts were compared.

EXAMPLE

A nickel-cobalt-molybdenum-alumina based catalyst (Ni : Co : Mo=0.56 : 1.0 : 7.79 (by weight)) having an average pore diameter of 124 Å, a porosity of 0.64 ml/g and a surface area of 206 m$^2$/g was employed as a catalyst and sulfurized under predetermined sulfurization conditions. Substantially equal amounts of the catalyst were present in each of four stages of a multi-stage hydrogenation system. The results obtained are shown in Table 1.

Table 1

| Sulfurization Conditions | Feed Material for Sulfurization | |
|---|---|---|
| | Light Gas Oil *1 | Hydrogen Sulfide *4 |
| Pressure (Kg/cm$^2$) | 140 | 1.5 |
| Temperature (° C.) | 300 | 200 to 300 |
| Space Velocity (V/V/hr) | 2 | — |
| Reactor Hydrogen Rate *3 (Nm$^3$/Kl) | 700 | — |
| Time (hours) | 10 | 10 |
| Desulfurization Activity *2 | | |
| after 1 day | 365° C. | 370° C. |
| after 4 days | 375° C. | 380° C. |
| after 8 days | 380° C. | — |

*1 Specific gravity: 0.84; sulfur content: 1.2% by weight.
*2 The desulfurization activity was measured as follows:
*3 H$_2$S content: 10 ppm by volume.
*4 Comparative data, H$_2$S content: 20,000 ppm by volume.

A heavy oil having a sulfur content of 1.0 percent by weight as a feed oil was hydrodesulfurized with each catalyst under the following conditions: pressure, 140 Kg/cm$^2$; space velocity, 0.5 V/V/hr; and reactor hydrogen rate, 700 Nm$^3$/Kl. The temperature was controlled so that the sulfur content of the product would be 0.3 percent by weight, and the temperature at which the sulfur content became 0.3 percent by weight was measured.

In this example, sulfurization of the catalyst was conducted successively in the order of from the final reactor stage to the first reactor stage.

Comparative Example

A nickel-cobalt-molybdenum-alumina based catalyst (Ni : Co : Mo=0.56 : 1.0 : 7.79 (by weight)) having an average pore diameter of 124 Å, a porosity of 0.64 ml/g and a surface area of 206 m$^2$/g was employed as a catalyst and sulfurized in the order of from the first stage of the four stages reaction process to the final stage. The results obtained are shown in Table 2.

Table 2

| Sulfurization Conditions | Feed Material for Sulfurization |
|---|---|
| | Light Gas Oil *1 |
| Pressure (Kg/cm$^2$) | 140 |
| Temperature (° C.) | 300 |
| Space Velocity (V/V/hr) | 2 |
| Reactor Hydrogen Rate (Nm$^3$/Kl) | 700 |
| Time (hours) | 10 |
| Desulfurization Activity *2 | |
| after 1 day | 368° C. |
| after 4 days | 378° C. |
| after 8 days | 385° C. |

*1 Specific gravity: 0.84; sulfur content: 1.2% by weight.
*2 The desulfurization activity was measured as follows:

A heavy oil having a sulfur content of 1.0 percent by weight as feed oil was hydrodesulfurized with each catalyst under the following conditions: pressure, 140 Kg/cm$^2$; space velocity, 0.5 V/V/hr; and reactor hydrogen rate, 700 Nm$^3$/Kl. The temperature was controlled so that the sulfur content of the product would be 0.3 percent by weight, and the temperature at which the sulfur content became 0.3 percent by weight was measured.

What is claimed is:

1. A process for activating a hydrogenation catalyst in a hydrogenation system having multiple reaction stages by sulfurization, which comprises sulfurizing the hydrogenation catalyst in each reaction stage thereof with a sulfur-containing hydrocarbon oil and a hydrogen-rich gas containing hydrogen sulfide in an amount of below 1,000 ppm (by volume) successively in the order of from the final reaction stage thereof to the first reaction stage thereof.

2. The process according to claim 1, wherein a gas obtained by removing the hydrogen sulfide contained in a hydrogen-rich gas discharged from said final reaction stage is employed as a hydrogen-rich gas for sulfurizing.

3. The process according to claim 1, wherein the catalyst is a hydrodesulfurization catalyst.

4. The process according to claim 1, wherein the catalyst is a nickel-cobalt-molybdenum-alumina based catalyst.

5. The process according to claim 1, wherein said hydrocarbon oil contains from about 0.5 to about 2 percent by weight of sulfur.

6. The process according to claim 1, wherein said gas is hydrogen essentially free of hydrogen sulfide.

7. The process according to claim 1, wherein the hydrogenation catalyst is so sulfurized at a temperature of from about 200° C. to about 450° C., a space velocity of from about 0.1 to about 3 V/V/hr, a pressure of from 40 to 200 kilogram per square centimeter, a hydrogen flow rate of from about 90 to about 1700 $Nm^3$ per kiloliter and for from about 2 to about 40 hours.

* * * * *